United States Patent [19]

Van Dest et al.

[11] Patent Number: 4,908,005
[45] Date of Patent: Mar. 13, 1990

[54] AXIALLY RETAINED WIDE FLEXING ANGLE HOMOKINETIC JOINT

[75] Inventors: Jean C. Van Dest, Saintry S/Seine; Pierre Guimbretiere, Neauphlesle Chateau; Bernard Poulain, Conflans Sainte Honorine; Francois Verbrugge, Cergy, all of France

[73] Assignee: Glaenzer-Spicer, Poissy, France

[21] Appl. No.: 411,235

[22] Filed: Sep. 22, 1989

Related U.S. Application Data

[62] Division of Ser. No. 250,138, Sep. 27, 1988, abandoned.

[30] Foreign Application Priority Data

Oct. 1, 1987 [FR] France ................. 87 13597
May 26, 1988 [FR] France ................. 88 07035

[51] Int. Cl.$^4$ ............................................. F16D 3/23
[52] U.S. Cl. ................................. 464/111; 464/905
[58] Field of Search ................ 464/111, 132, 905

[56] References Cited

U.S. PATENT DOCUMENTS

| | | | |
|---|---|---|---|
| 4,175,407 | 11/1979 | Orain | 464/111 |
| 4,178,778 | 12/1979 | Orain | 464/111 |
| 4,205,539 | 6/1980 | Orain | 464/111 |
| 4,512,750 | 4/1985 | Orain | 464/111 |
| 4,582,502 | 4/1986 | Girguis | 464/111 |

*Primary Examiner*—Daniel P. Stodola
*Attorney, Agent, or Firm*—Wenderoth, Lind & Ponack

[57] ABSTRACT

An axially retained homokinetic joint comprises an element in the form of a tripod (20) connected to one (22) of two shafts to be coupled and a tulip element (42) connected to the other (34, 134) of the two shafts, the tripod element comprising three trunnions (26a) on which are rotatively and slidably mounted rollers (36a) received in three rolling tracks (40) formed in the tulip element, and are an axial retainer (44) for maintaining the two parts of the joint in position relative to each other. The axial retainer comprises an intermediate member (44) connected to the tulip element (42) and cooperating with the tripod element (20) by means of a connection enabling the latter to move in a plane at right angle to its axis (X—X). The rolling tracks (40) consist of tracks of substantially toroidal shape in which run rollers whose outer surface is spherical.

14 Claims, 8 Drawing Sheets

AXIALLY RETAINED WIDE FLEXING ANGLE HOMOKINETIC JOINT

This application is a division of now abandoned application, Ser. No. 07/250,138 filed on Sept. 27, 1988, abandoned.

BACKGROUND OF THE INVENTION (1) Field of the Invention

The present invention relates to an axially retained wide flexing angle homokinetic joint.

It deals more particularly with a homokinetic joint of the type comprising a tripod-shaped element connected to one of two shafts to be coupled, and a tulip element connected to the other of the shafts, the tripod element comprising three trunnions on which are rotatively and slidably mounted rollers received in three rolling tracks provided in the tulip element, and axial retaining means for maintaining the two parts of the joint in position relative to each another.

(2) State of the Prior Art

Homokinetic joints, known as fixed tripod joints, have been used for many years in the automotive industry, in which they are installed at the wheel end of transmission systems transmitting the drive from the power unit to the driving wheels of front wheel drive vehicles. The design principle of homokinetic joints of this type has been described and illustrated in the document FR-A-1,272,530.

Minimum dimensions, with respect to both diameter and length, and the widest possible angle of flexure, are the two main requirements due to the use of these joints in motor vehicles of recent design.

A homokinetic joint in which the rolling tracks are of a substantially toroidal shape and receive the rollers, whose outer surface is spherical, has small longitudinal dimensions and also a slightly smaller diameter than a joint in which the roller tracks have their axes parallel to the axis of the tulip element. In addition, the tulip connected to one of the two shafts to be coupled and the bowl-shaped member which serves to connect the tripod element to the other shaft can penetrate one into the other, as in the case of the jaws of a wide-angle cardan joint. A basic arrangement of this kind is known from the document U.S. 3,877,251, but it provides only a partial solution to the problem of a very wide-angle joint of small dimensions.

In order to eliminate the relative axial freedom of movement of the two shafts, it is necessary to provide an appropriate device which enables the homokinetic joint to keep its properties of mechanical strength and angular movement. Thus, in the document FR-A-1,272,530 the basic principle adopted there (FIGS. 3 and 8) consists in giving the central part of the tripod element a spherical shape cooperating with two opposite plane surfaces extending in substantially radial plane and provided in the tulip element. Nevertheless, in an arrangement of this kind the application of the axial stresses is practically punctiform and the joint wears out relatively rapidly.

Subsequently, numerous solutions were proposed for axially retained tripod of similar joints, for example those described in the document FR-A-2,398,924, which employ the principle consisting in axially maintaining the joint through the cooperation of plane surfaces and spherical dome-shaped segments in the proximity of the axis of rotation of the second shaft.

However, the document FR-A-2,398,924 describes, and illustrates in FIGS. 7 to 11, a homokinetic joint in which the axis of the rolling tracks is parallel to the shaft connected to the tulip element, but in which the axial retainer comprises an intermediate member delimiting a convex spherical outer surface received in a concave spherical cavity entirely formed in the tulip element. Although it enables the joint function characteristics to be substantially improved, this design has the main disadvantage of entailing large dimensions of the joint both with respect to diameter and with respect to length, while, in addition, its maximum flexing angle is substantially equal to 43°.

The kinematics of the joint must also permit displacements of the tripod element in a plane defining a right angle to its axis, which is impossible in the case of the joint described in the document U.S. 3,877,251, which does not appear to be able to allow the joint to be placed at an angle without jamming. Moreover, the design of this joint is scarcely realistic from the point of view of large scale industrial production.

Also known in the document FR-A-2,394,711, which desribes and illustrates a transmission joint which does not belong to the technical domain of axially retained joints, since it is a joint permitting axial sliding of one shaft relative to the other. The structure of the components ensuring the connection between the tripod element 104 and the tulip element does not allow movement of the tripod element in a plane at right angle to its axis for the purpose of absorbing the offset movement. Quite on the contrary, as is indicated in Page 1 (lines 22-25) of document FR-A-2,394,711, the aim sought is to suppress the offset movement of the shaft connected to the tripod element.

SUMMARY OF THE INVENTION

The present invention therefore seeks to provide a homokinetic joint of small dimensions and with an angularity of flexion greater than 50°.

To this end, the invention proposes an axially retained homokinetic joint comprising a tripod-shaped element connected to one of the shafts to be coupled and a tulip element connected to the other of the shafts, the tripod element comprising three trunnions on which are rotatively and slidably mounted rollers received in three rolling tracks formed in the tulip element, and an axial retainer for maintaining the two parts of the joint relative to one another. The axial retainer comprises an intermediate member connected to the tulip element and cooperating with the tripod element by means of a connection enabling the latter to move in a plane at right angle to its axis, and in that the rolling tracks consist of tracks of substantially toroidal shape, in which run rollers whose outer surface is spherical.

As the result of this design, an axially retained very wide flexing angle tripod joint of a small radial and longitudinal dimensions is thus obtained.

According to another feature, the intermediate member has a spherical surface which cooperates with a complementary spherical surface formed in the tulip element. The geometrical center of the toroidal tracks advantageously coincides with the geometrical center of the complementary spherical surface.

The invention also proposes a particularly simple design of the joint, in which the intermediate member delimits a convex spherical surface which is received in a concave spherical seat formed in the axial branches of the tulip element.

In order to enable the tripod element to move in a plane at right angle to the axis of the shaft to which it is connected and thus to allow the "offset" movements inherent to this type of homokinetic joint, the intermediate member has a first plane surface perpendicular to the axis of the tripod element and cooperating with a first contact zone provided in confronting relation on the tripod element. Improved guidance of the deflection movements of the tripod is obtained when the intermediate member has a second plane surface parallel to the first plane surface and cooperating with a second contact zone formed on the tripod.

In one embodiment of the invention the first contact zone formed on the tripod element is a first plane surface perpendicular to the axis of the tripod element. The second contact zone formed on the tripod element may also consist of a second plane surface parallel to the first plane surface formed on the tripod element.

As a variant, one of the two plane surfaces on the intermediate member may cooperate directly with the spherical outer surface of the rollers, whose coplanar points of contact define the second contact zone formed on the tripod element.

The design just described makes it possible to obtain an axially retained, very wide flexing angle tripod joint with small radial and longitudinal dimensions.

It is, however, found that an operating clearance generating wear and noise may occur between the convex and concave spherical surfaces.

Furthermore, when the intermediate member is a single piece provided with parallel plane surfaces between which the tripod element slides, an axial manufacturing clearance exists which it is also desirable to reduce or eliminate.

In order to improve still further the operating quality of these joints, the invention proposes a homokinetic joint of the type defined above, characterized in that the axial retainer comprises a device bearing against the tulip element to urge the tripod element in a direction parallel to the axis of the tripod element and in the sense corresponding to the maintaining of the contact zone in contact with said plane surface of the intermediate member.

According to further features of the invention, the device:

comprises a support member having a plane surface at a right angle to the axis of the tripod element and cooperating with a second contact zone formed on the tripod element and parallel to the first contact zone.

The support member is mounted for sliding relative to the intermediate member in a direction parallel to the axis of the tripod element.

The intermediate member comprises three legs extending axially from its plane surface between the trunnions of the tripod element, the support member being slidably mounted between these legs.

The support member also has three legs, extending axially from its plane face between the pins of the tripod element to cooperate with the axial legs of the intermediate member.

The inner radial face of each of the legs of the intermediate member is provided with an axial guide groove which slidingly receives a radial projection formed on the outer surface of the corresponding leg of the support member.

The support member may have a convex surface against which a prestressing member bears.

The prestressing member may in one form be a spring consisting of a resilient star-shaped fastener, the ends of the branches of which clip onto the socket and the central portion of which provides the axial prestressing of the support member.

The prestressing member may also be provided with a pusher interposed between the central portion of the resilient fastener and the support member and having a concave surface complementary to the convex surface of the support member.

These convex and concave surfaces are preferably spherical surfaces.

Alternatively, the prestressing member may be a is a closure member attached to the open end of the tulip element, its central portion providing the axial prestressing of the support member.

The attached closure member has a concave surface complementary to the convex surface of the support member, and may be a member welded to the free ends of the branches of the tulip element.

BRIEF DESCRIPTION OF THE DRAWINGS

Other features and advantages of the invention will emerge on perusal of the detailed description given below, for the understanding of which reference will be made to the accompanying drawings, in which.

DESCRIPTION OF THE PREFERRED EMBODIMENTS

The homokinetic joint shown in FIGS. 1 to 4 comprises a tripod element 20, which is rotatively driven by a tubular shaft 22 with the aid of a bowl element 24. The tripod element consists of three trunnions 26a, 26b and 26c, which are evenly spaced apart at 120° and connected together by a central hub 28. The bowl element 24 has three axial branches 30a, 30b and 30c, to which the trunnions are connected, for example by means of screws (not shown).

The tubular shaft 22, having an axis X—X, drives rotatively a solid shaft 34 having an axis Y—Y, through three rollers 36a, 36b and 36c which are rotatively and slidably mounted on the trunnions 26a, 26b and 26c respectively. Each of the rollers has a cylindrical bore 38, into which the corresponding trunnion extends. For the purpose of driving the shaft 34 in rotation, each of the rollers is received in a rolling track 40 formed in a tulip element 42 extending the solid shaft 34.

According to the invention the rolling tracks are composed of pairs of tracks of substantially toroidal shape in which the rollers run, the outer surface of the rollers being spherical. The geometrical centre C of the toroidal tracks is situated on the axis Y—Y of the shaft 34. In an application to a front wheel drive motor vehicle, the solid shaft 34 forms a stub axle which drives a wheel (not shown), the hollow tubular shape 22 being connected to the output of the transmission differential.

The tracks 40 may be perfectly toroidal, as in the embodiment illustrated in the drawings, or substantially toroidal, that is to say, for example, the centre of the tracks being eccentric in relation to the axis X—X.

The homokinetic joint is provided with an axial retainer to maintain the two parts of the joint in relation to one another, and to enable them to be placed at an angle.

According to the invention these axial retainer comprises an intermediate member 44 connected to the tulip element 42 and cooperating with the tripod element 20 by means of a connection enabling the latter to move at a right angle to its axis X—X.

The intermediate member 44 of the axial retainer has substantially the shape of a ball delimiting a convex spherical outer surface 46. The spherical outer surface 46 is received in a concave spherical cavity 48 formed in three axial branches 50 of the tulip element 42.

Figures 1, 2:
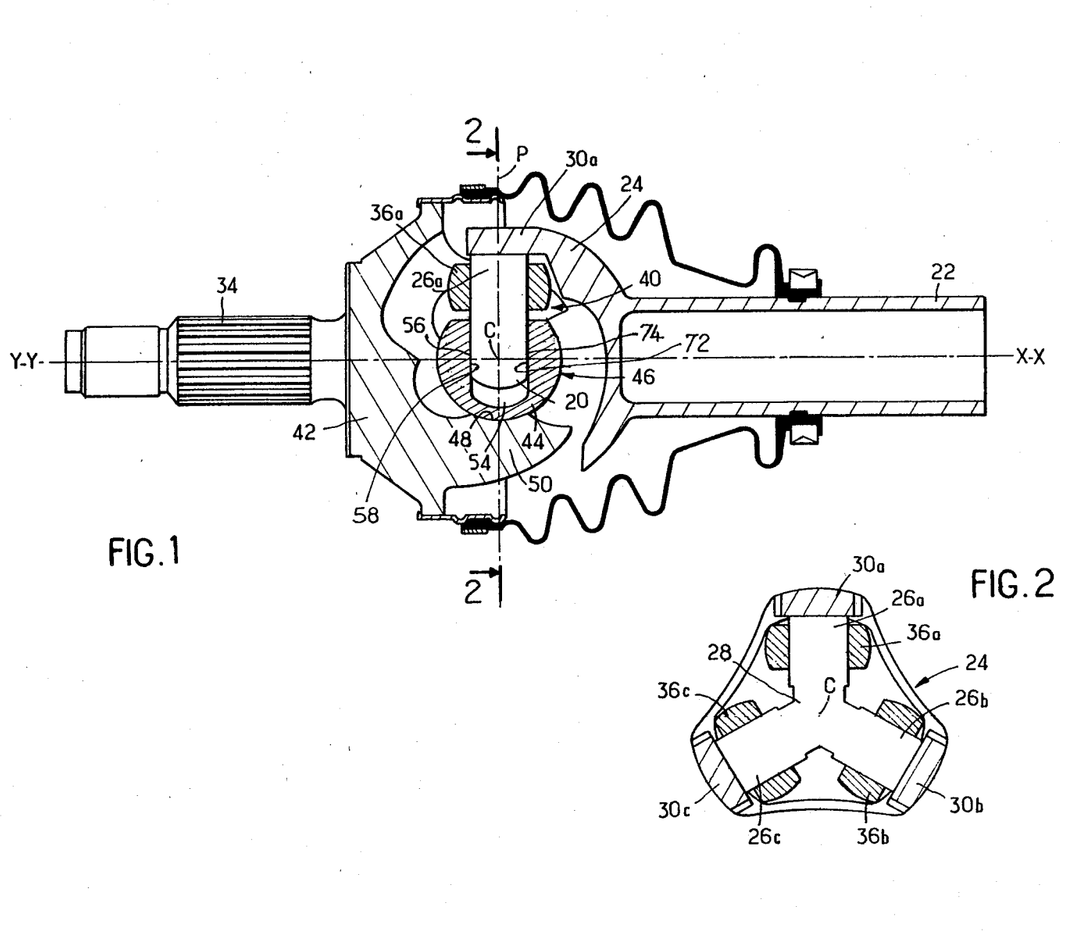
FIG. 1 is a simplified schematic view in axial section of a first embodiment of a tripod joint according to the invention, shown in its aligned position.
FIG. 2 is a simplified sectional view along line 2—2 of FIG. 1.
Figure 3:
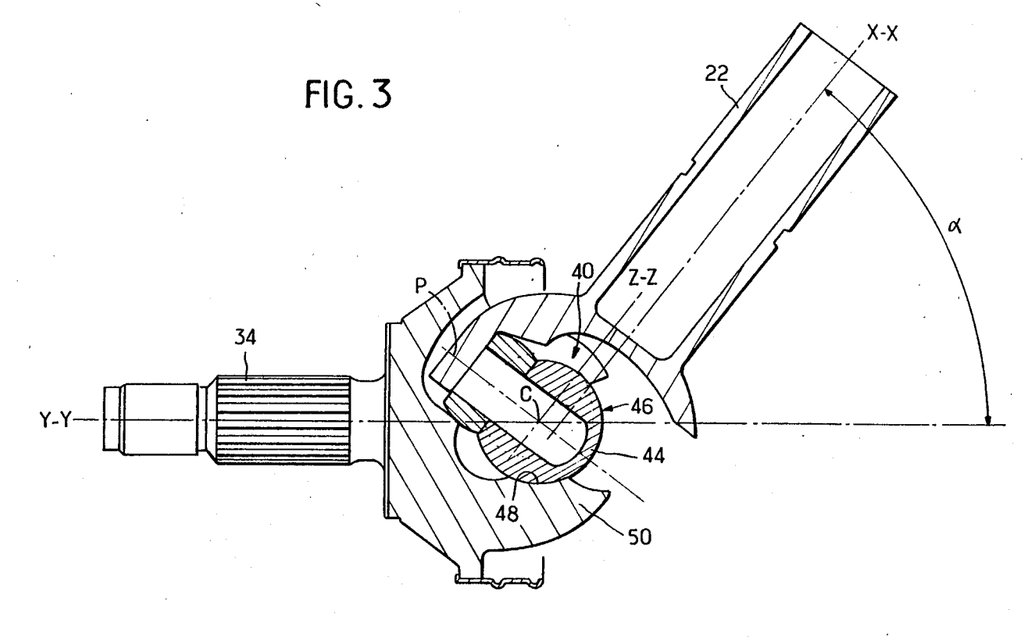
FIG. 3 is a view similar to that in FIG. 1, showing the joint at its maximum flexing angle.
Figure 4:
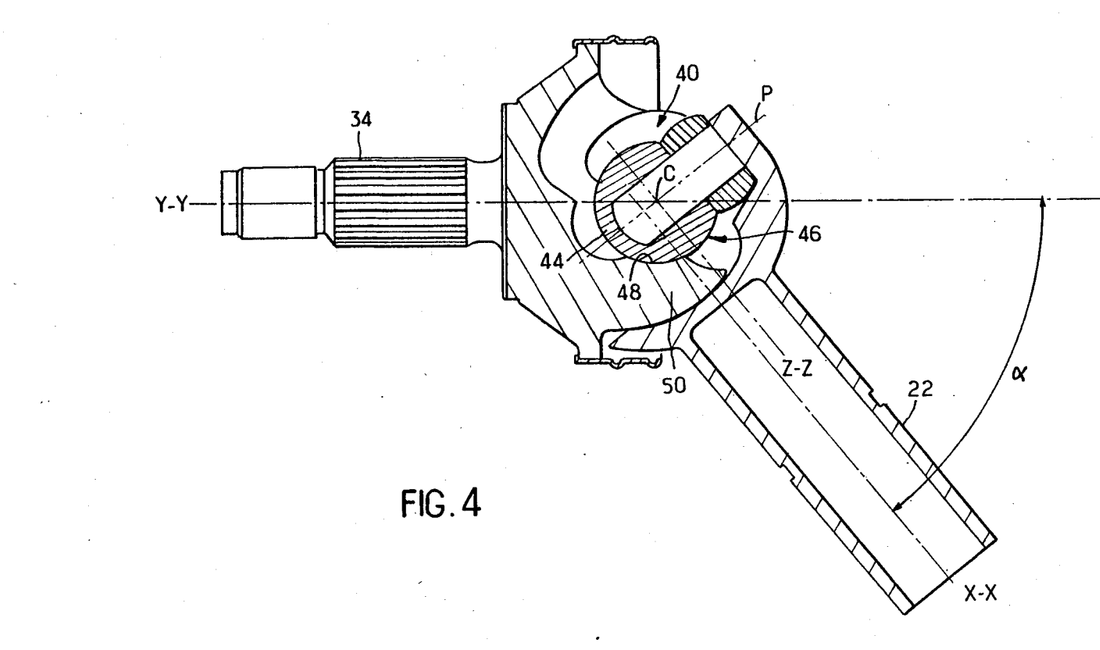
FIG. 4 is a view similar to that in FIG. 3, showing the joint at an opposite flexing angle to that shown in FIG. 3.

The geometrical center of the concave spherical cavity 48 coincides with the geometrical centre C of the toroidal tracks 40. For the sake of greater clarity, the section shown in FIG. 2 does not include either the intermediate member 44 or the branches 50 of the tulip element 42. As can be seen in FIGS. 1, 3 and 4, the intermediate member 44 has a polar axis Z—Z which remains parallel to the axis X—X of the hollow tubular shaft 22 whatever the angular position of the axis X—X in relation to the axis Y—Y. The term "equatorial plane" of the intermediate member 44 will be used to describe the plane P perpendicular to the polar axis Z—Z and passing through the geometrical center of the.

The tripod element 20 is mounted inside an equatorial cavity 54 in the intermediate member 44, inside which cavity it can be displaced and deflected perpendicularly to its axis X—X, that is to say parallel to the equatorial plane P.

The equatorial cavity 54 is delimited axially, on the left referring to FIG. 1, by a first plane surface 56 perpendicular to the polar axis Z—Z, this surface participating in the guiding of the displacement of the tripod element 20. This first plane guide surface 56 cooperates with a corresponding first plane surface 58 of the tripod, at a right angle to the axis of the tripod. The zone of contact between the tripod and the first plane surface 56 of the intermediate member 44, which constitutes the first plane surface 58, could as a variant, and by way of example, be replaced by three coplanar external generatrices of the three trunnions to form, in cooperation with the plane surface 56, an equivalent plane-on-plane guide.

The equatorial cavity 54 is delimited axially, an the right referring to FIG. 1, by a second plane surface 72 guiding the displacement of the tripod element 20 and lying parallel to the first plane surface 56 of the equatorial cavity 54. The second plane surface 72 cooperates with a corresponding second plane surface 74 provided on the tripod 20 and forming a second zone of contact provided on the tripod element and lying parallel to the first plane surface 58 of the tripod element.

As can be seen, particularly in FIG. 1, the first and second plane surfaces 56 and 72 are advantageously disposed symmetrically, one on each side of the equatorial plane P of the intermediate member 44. These two plane surfaces 56 and 72 are spaced axially apart at a distance substantially equal to the axial thickness separating the first and second guide surfaces 58 and 74 of the tripod element 20.

In order to show the design principle of the homokinetic joint according to the invention without showing constructional details which would complicate the illustration, the structure enabling the tripod element 20 to be assembled and mounted aside the equatorial cavity 54 have not been shown in detail. For this purpose the tripod element 20 may for example be composed of three parts, the trunnions being connected individually to a central hub 28 previously introduced into the equatorial cavity 54. Alternatively, the ball-shaped intermediate member 44 may be constructed in accordance with the content of the document FR-A-2,398,294, particularly in the form of a slotted ball permitting the axial introduction of the tripod element into the equatorial cavity 54.

As illustrated in FIGS. 3 and 4, the design according to the invention makes it possible to obtain a maximum angle of flexion of the joint greater than 50°, as well as very small longitudinal dimensions of the assembly of components forming the joint.

Figure 5:
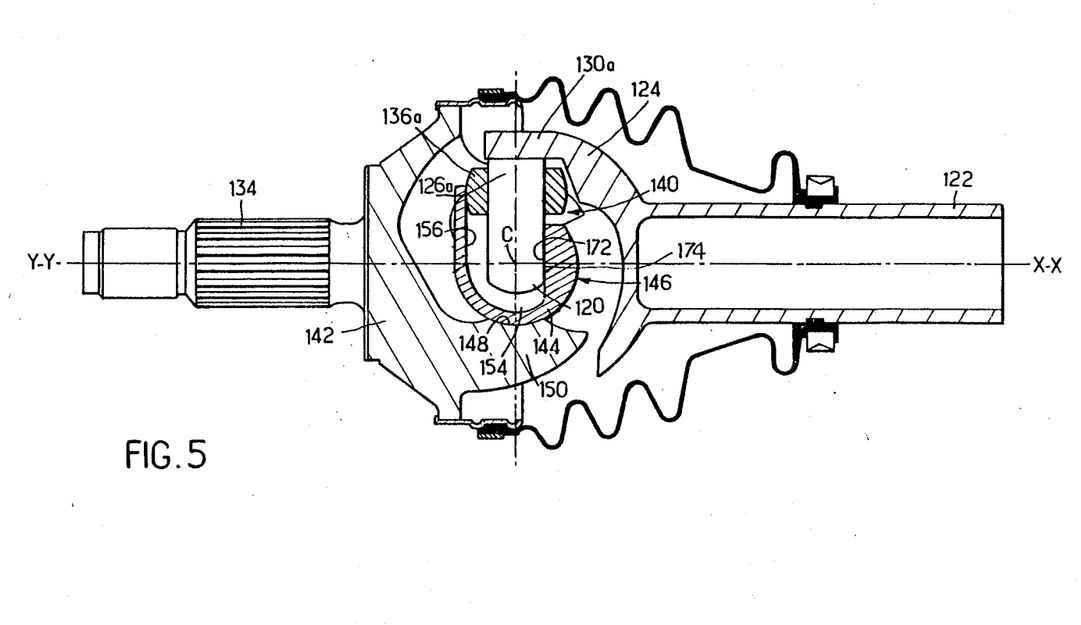
FIGS. 5 and 6 are views similar to those in FIGS. 1 and 3, relating to a second embodiment of a constant-velocity joint according to the invention.
Figure 6:
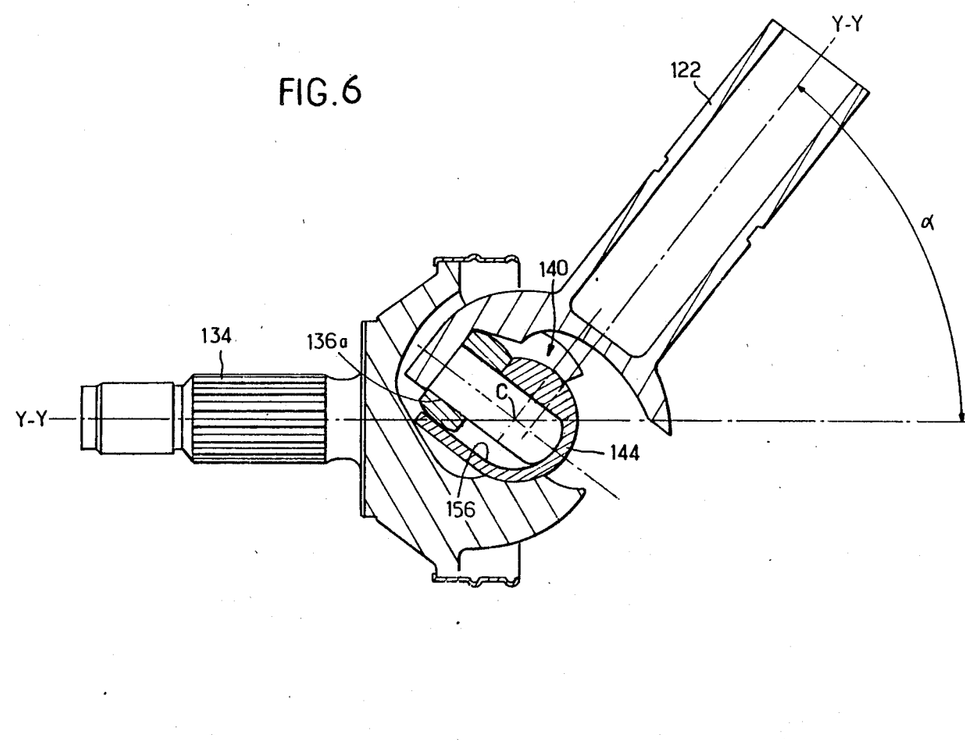

The second embodiment of a homokinetic joint, shown in FIGS. 5 and 6, differs from the first embodiment just described only with respect to the mode of cooperation between the tripod element 20 and the first plane surface formed in the intermediate member 44 for the purpose of guiding the movements of the tripod element.

Members identical or equivalent to those shown in FIGS. 1 to 4 are given in FIGS. 5 and 6 the same reference numerals increased by 100.

The first plane guide surface 156 formed in the intermediate member 144 here cooperates with the spherical outer surface of the rollers 136, and is for this purpose extended radially outwards from the central part of the intermediate member 144. The zone of contact on the left-hand side, referring to FIGS. 5 and 6, between the tripod element 120 and the first plane surface 156 is thus composed of three substantially punctiform, coplanar zones of contact distributed at intervals of 120° around the axis X—X of the tripod element 120.

As an alternative, which is not illustrated, the outer surface of the rollers may cooperate with the second plane surface and/or the two plane surfaces of the intermediate member.

A description will now be given of the embodiment illustrated in FIGS. 7 to 9. Members identical or equivalent to those shown in FIGS. 1 to 4 are given the same reference numerals increased by 200.

The homokinetic joint is provided with an axial retainer for holding the two parts of the joint in relation to one another and for enabling them to be flexed at an angle.

The axial retainer comprises an intermediate member 244 which is connected to the tulip element 242 and which cooperates with the tripod element 220 by means of a connection enabling the tripod element to move at a right angle to its axis X—X in relation to the socket 242.

The intermediate member 244 has substantially the shape of a spherical dome shaped segment and delimits a convex spherical outer surface 246. The spherical outer surface 246 is received in a concave spherical seat 248 formed in the three axial branches 250 of the tulip element 242.

The geometrical center of the concave spherical seat 248 here coincides with the geometrical centre C of the toroidal tracks 240.

The intermediate member has a polar axis which remains parallel to the axis X—X of the shaft 222 whatever the angular position of the axis X—X in relation to the axis Y—Y. The imaginary geometrical plane P perpendicular to the polar axis of the intermediate member 244 and passing through its geometrical center will be called the equatorial plane of the intermediate member 244.

The intermediate member 244 is a member having the shape of a spherical dome provided with a plane guide surface 256 parallel to the equatorial plane P and participating in the guiding of the displacement of the tripod element 220.

In the embodiment illustrated the member 244 is hollow and the plane guide surface 256 is composed of three plane-surface portions distributed at angles of 120° around the polar axis of the spherical dome and cooperating with a corresponding first plane surface 258 on the tripod element, at a right angle to the axis of the tripod element. The zone of contact of the tripod element with the first plane surface 256 of the intermediate member 244, that is to say the first plane surface 258, is composed of three coplanar flats formed on the three trunnions to constitute, in cooperation with the three plane surface portions 256, a plane-on-plane guide for the tripod element 220 in relation to the spherical dome 244.

Figure 7:
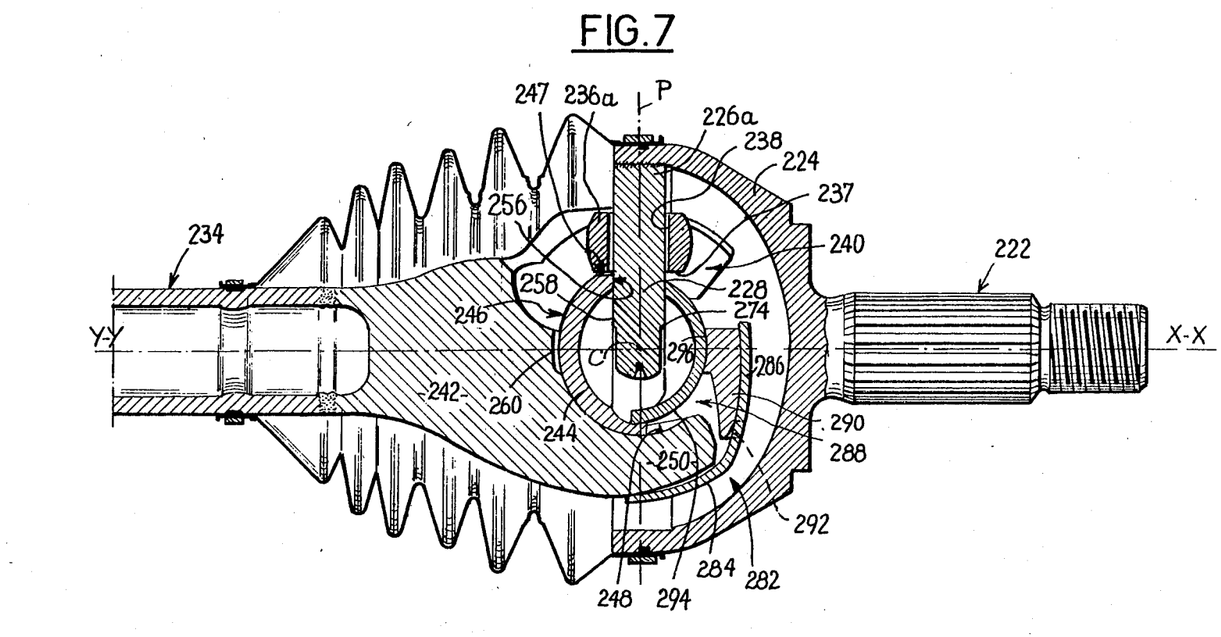
FIG. 7 is a simplified schematic view in axial section of a third embodiment of the invention, shown in its aligned position.

As can be seen in FIG. 7, when the joint is in its aligned position the plane guide surface formed by the three portions 256 is axially offset towards the left in relation to the diametrical plane P. The concave spherical guide surface 248, with which the convex spherical surface 246 of the intermediate spherical dome 244 cooperates, extends to the right beyond the diametrical plane P.

The concave spherical surface 248 is also provided with a recessed portion 260 centered on the axis Y—Y and making it possible to avoid the machining of the pole of the spherical portion inside the branches 250 of the tulip element 242.

According to the invention the axial retainer of the joint also comprises an arrangement 280 making it possible to apply a resilient prestress to the tripod element 220 parallel to the direction of its axis, in such a manner as to maintain the plane surfaces 256 and 258 in permanent contact.

The resilient arrangement 280 comprises a star-shaped resilient fastener 282, whose three branches 284 engage their ends in correspoding notches in the outer peripheral surface of the tulip element 242.

A central part 286 of the fastener 282 axially stresses a support member 288 with the aid of a pusher 290 comprising three branches 292 fitted onto the branches 284 of the fastener 282.

The support member 288 also has the shape of a hollow spherical dome whose convex spherical outer surface 294 cooperates with a complementary concave spherical surface 291 provided in confronting relation in the pusher 290.

Figures 8, 9:
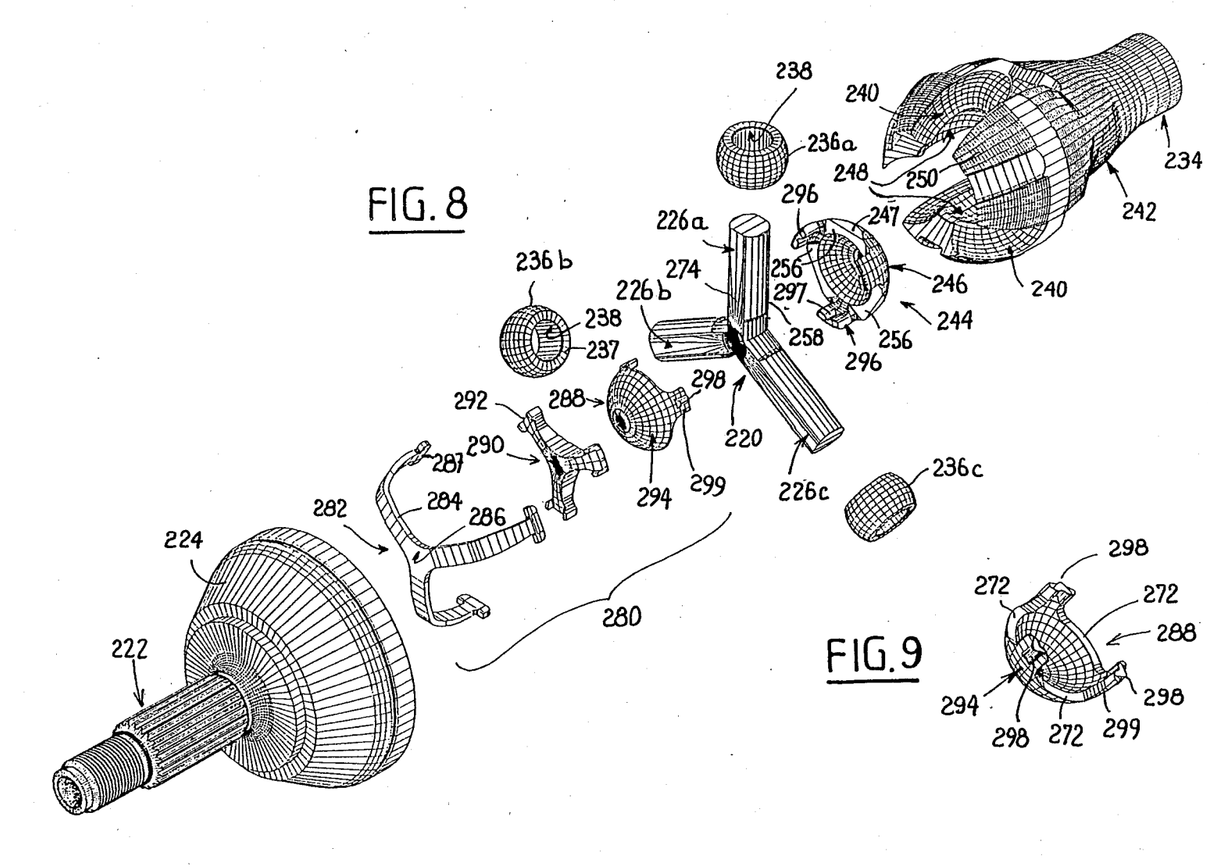
FIG. 8 is a simplified exploded view in perspective of the homokinetic joint shown in FIG. 7.
FIG. 9 is a view in perspective showing the support member in a positioned turned over in relation to that it occupies in FIG. 8.

As can be seen in FIG. 9, the support member 288 has a plane surface 272 which, like the plane surface 256 of the intermediate member 244, is composed of three coplanar plane surface portions 272 distributed at angles of 120° and intended to cooperate with a corresponding second plane surface 274 provided on the tripod element 220. Like the first plane surface 258 to which it is parallel, the second plane surface 274 is composed of corresponding flats formed on the three trunnions.

The dimensions of the pusher 290, of the fastener 282 and of the support member 288 are so selected that the resilient arrangement 280 permanently applies to the tripod element 220 an axial prestress which has the effect of bringing the second plane surface 272 to bear against the second plane surface 274 of the tripod element, and then bringing the first plane surface 258 to bear against the three plane surface portions 256, and finally bringing the spherical surfaces 246 and 248 to bear one against the other. Any axial play is thus eliminated.

The support member 288 is mounted for sliding relative to the spherical dome 244 in a direction parallel to the axis of the tripod element, that is to say at right angle to the plane surfaces 256 and 272.

For this purpose the intermediate member 244 is provided with three legs 296 extending from the surfaces 256 parallel to the axis of the tripod element, between the trunnions of the latter. As can be seen in FIGS. 7 and 8, the convex spherical surface 246 is extended on the axial legs 296 in such a manner that its cooperation with the concave spherical surface 248 extends beyond the diametrical plane P.

Each of the axial legs 296 is provided on its inner radial face with an axial groove 297.

Each of the axial grooves 297 is arranged to receive slidingly a portion 298, projecting radially outwards from the convex spherical surface 294, of a corresponding axial leg 299 provided on the support member 288 and extending axially parallel to the axis of the tripod element.

Because of the cooperation between the radial projections 298 and the axial grooves 297, the support member 288 is mounted for sliding between the legs 296 of the spherical dome 244, in such a manner as to enclose the tripod element and to maintain a permanent contact between the plane surfaces 256 and 272 and, respectively, the parallel contact zones 258 and 274 of the tripod element.

Those edges 237 of the rollers which face the intermediate member 244 are each opposite a flat 247 formed on the outer surface of the member 244. Each flat 247 extends in a plane perpendicular to the diametrical plane P.

In the normal operating position a clearance exists between the flats 247 and the edges 237. However, these stop surfaces are adapted to come occasionally into contact with each other in such a manner as to hold the member 244 in a centered angular position in relation to the tripod element, the support member 288 being itself indexed with respect to rotation in relation to the intermediate member 244, to which it is angularly connected by the legs 296 and 299.

Figure 10:
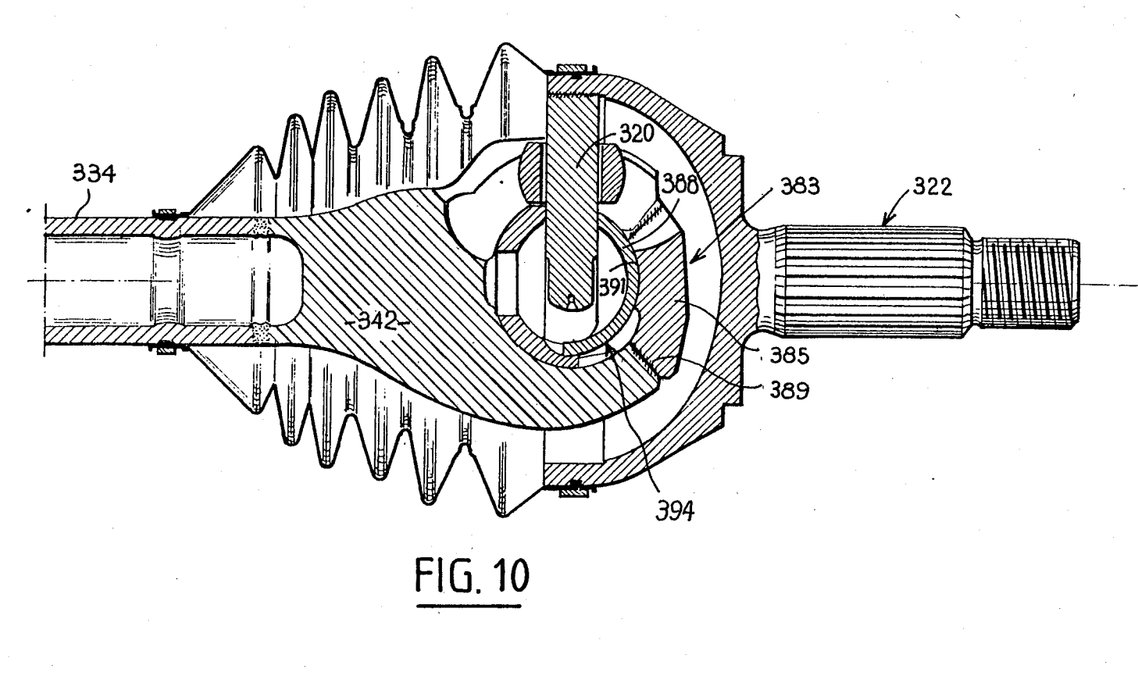
FIG. 10 is a view similar to that in FIG. 7 of a fourth embodiment of the invention.

The fourth embodiment illustrated in FIG. 10 differs from the preceding embodiment in the nature of the arrangement axially prestressing the joint. This arrangement comprises a support member 388 in every respect identical to that described with reference to and illustrated in FIGS. 7 to 9.

The support member is stressed axially in the direction of the tripod element 320 by an attached member 383. The member 383 is a rigid star-shaped member comprising a central portion 385 and three branches 389. The central portion 385 has a concave spherical surface 391 which, like the surface 291, cooperates with the convex surface 394 of the support member 388.

The free end of each of the branches 390 is here fixed by welding to the free end of the branch 350 facing it on the tulip element 342.

We claim:

1. A homokinetic joint for coupling two shafts, comprising:
    a tripod element for connection to one of the shafts, said tripod element comprising three trunnions, rollers having substantially spherical outer surfaces and slidably mountable on respective said trunnions, and a central axis;
    a tulip element connected to the other shaft, said tulip element comprising three substantially toroidally shaped rolling tracks for receiving said rollers therein so that said rollers can run in said tracks and axial branches defining a concave spherical surface; and
    an axial retaining means for axially maintaining said tripod element and said tulip element in position relative to each other, said axial retaining means comprising an intermediate member, and said intermediate member having a convex spherical surface complementary to and cooperating with said concave spherical surface of said tulip element and a connection means for connection with said tripod element such that said tripod element is movable in a plane perpendicular to said central axis;
    wherein said intermediate member haas a plane surface perpendicular to said central axis and legs extending axially from said plane surface between said trunnions of said tripod element, said tripod element has an opposite first contact zone confronting and cooperating with said plane surface and a second contact zone parallel to said first contact zone, said axial retaining means further comprises urging means, in contact with said tulip element, for urging said tripod element in a direction parallel to said axis to maintain contact between said first contact zone and said plane surface of said intermediate member, said urging means comprising a support member slidably mounted relative to and between said legs of said intermediate member for sliding movement parallel to said central axis, said support member having a plane face perpendicular to said central axis and cooperating with said second contact zone.

2. The homokinetic joint as set forth in claim 1, wherein:
    said substantially toroidally shaped rolling tracks of said tulip element have an overall geometric center coincident with the geometric center of said concave spherical surface of said tulip element.

3. The homokinetic joint as set forth in claim 1, wherein:
    said first contact zone of said first tripod element is a plane surface perpendicular to said central axis.

4. The homokinetic joint as set forth in claim 1, wherein:
    said second contact zone of said tripod element is a plane surface.

5. The homokinetic joint as set forth in claim 1, wherein:
    said support member comprises three legs extending from its plane face, between said trunnions of said tripod element, and cooperating with said legs of said intermediate member.

6. The homokinetic joint as set forth in claim 5, wherein:
    an inner radial face of each of said leg of said intermediate member has an axial guide groove therealong;
    a outer surface of each of said legs of said support member has a radial projection thereon; and
    said radial projections are slidingly received within said guide grooves.

7. The homokinetic joint as set forth in claim 1, wherein:
    said support member has a convex surface; and
    said urging means further comprises a prestressing means bearing against said convex surface of said support member.

8. The homokinetic joint as set forth in claim 7, wherein:
    said prestressing means comprises a star shaped resilient spring fastener having a central portion and a plurality of branches extending therefrom, the ends of said branches connecting to said tulip element and said central portion prestressing said support member.

9. The homokinetic joint as set forth in claim 8, wherein said prestressing means further comprises:
    a pusher member interposed between said central portion of said resilient spring fastener and said support member, and having a concave surface complementary to and engaged with said convex surface of said support member.

10. The homokinetic joint as set forth in claim 9, wherein:
    said concave and said convex surfaces are spherical surfaces.

11. The homokinetic joint as set forth in claim 7, wherein:
    said prestressing means comprises a closure member having a central portion for prestressing said support member; and
    said closure member is connected to said tulip element.

12. The homokinetic joint as set forth in claim 11, wherein:
    said closure member is welded to the free ends of said axial branches of said tulip element.

13. The homokinetic joint as set forth in claim 11, wherein:
    said closure member has a concave surface complementary to said convex surface of said support member.

14. The homokinetic joint as set forth in claim 13, wherein:
    said concave and said convex surfaces are spherical surfaces.

* * * * *